United States Patent
Nomura et al.

(10) Patent No.: US 12,456,601 B2
(45) Date of Patent: Oct. 28, 2025

(54) CHARGED PARTICLE BEAM WRITING METHOD, CHARGED PARTICLE BEAM WRITING APPARATUS, AND COMPUTER-READABLE RECORDING MEDIUM

(71) Applicant: NuFlare Technology, Inc., Yokohama (JP)

(72) Inventors: Haruyuki Nomura, Yokohama (JP); Noriaki Nakayamada, Kamakura (JP)

(73) Assignee: NuFlare Technology, Inc., Yokohama (JP)

( * ) Notice: Subject to any disclaimer, the term of this patent is extended or adjusted under 35 U.S.C. 154(b) by 466 days.

(21) Appl. No.: 18/167,919

(22) Filed: Feb. 13, 2023

(65) Prior Publication Data

US 2023/0290608 A1    Sep. 14, 2023

(30) Foreign Application Priority Data

Mar. 11, 2022   (JP) ................................ 2022-038282

(51) Int. Cl.
  *H01J 37/317* (2006.01)
  *H01J 37/147* (2006.01)
  *H01J 37/302* (2006.01)

(52) U.S. Cl.
  CPC ...... *H01J 37/3174* (2013.01); *H01J 37/1472* (2013.01); *H01J 37/3026* (2013.01);
  (Continued)

(58) Field of Classification Search
  CPC ............... H01J 37/3174; H01J 37/1472; H01J 37/3026; H01J 2237/24507;
  (Continued)

(56) References Cited

U.S. PATENT DOCUMENTS

| 4,712,013 A | 12/1987 | Nishimura et al. |
| 9,437,396 B2 | 9/2016 | Matsumoto |

(Continued)

FOREIGN PATENT DOCUMENTS

| JP | 61-202430 A | 9/1986 |
| JP | 5-267140 A | 10/1993 |

(Continued)

OTHER PUBLICATIONS

Taiwanese Office Action issued Feb. 6, 2024 in Taiwanese Patent Application No. 112105591 (with unedited computer-generated English translation), 14 pages.
(Continued)

*Primary Examiner* — David E Smith
*Assistant Examiner* — Laura Eloise Tandy
(74) *Attorney, Agent, or Firm* — Oblon, McClelland, Maier & Neustadt, L.L.P.

(57) ABSTRACT

In a charged particle beam writing method according to an embodiment, a charged particle beam is deflected by a deflector, and a pattern is written by irradiating, with the charged particle beam, a substrate having a resist film formed thereon. The method includes irradiating a pattern region, in which a pattern is to be formed, with a beam at a first dose, irradiating at least part of a non-pattern region, in which a pattern is not to be formed, with the charged particle beam at a second dose, at which the resist film is not dissolved away, and determining the second dose based on the first dose and a charge amount of the resist film corresponding to a pattern density of the pattern region, wherein a charge amount difference between the pattern region and a non-dissolution irradiation region, which is irradiated at the second dose, is smaller than that obtained when the second dose is zero.

14 Claims, 7 Drawing Sheets

(52) U.S. Cl.
CPC ............ *H01J 2237/24507* (2013.01); *H01J 2237/31769* (2013.01); *H01J 2237/31776* (2013.01)

(58) Field of Classification Search
CPC ... H01J 2237/31769; H01J 2237/31776; H01J 2237/0048; H01J 37/10; H01J 37/147; G03F 7/2059; G03F 7/2061
See application file for complete search history.

(56) References Cited

U.S. PATENT DOCUMENTS

| | | | |
|---|---|---|---|
| 2018/0090298 A1 | | 3/2018 | Nakayamada |
| 2018/0090299 A1 | | 3/2018 | Nakayamada |
| 2019/0362937 A1 | * | 11/2019 | Nakayamada ........ H01J 37/244 |
| 2020/0373122 A1 | * | 11/2020 | Fujimura ............ H01J 37/3026 |
| 2022/0384142 A1 | | 12/2022 | Nomura et al. |
| 2023/0102923 A1 | | 3/2023 | Nomura et al. |

FOREIGN PATENT DOCUMENTS

| | | |
|---|---|---|
| JP | 2006-93726 A | 4/2006 |
| JP | 6545437 B2 | 7/2019 |
| JP | 2021-180224 A | 11/2021 |
| JP | 2022-96502 A | 6/2022 |
| TW | 201003710 A1 | 1/2010 |
| TW | 202102933 A | 1/2021 |
| TW | 202207267 A | 2/2022 |
| TW | 202209394 A | 3/2022 |

OTHER PUBLICATIONS

Combined Taiwanese Office Action and Search Report issued Jul. 8, 2024 in Taiwanese Patent Application No. 112105591 (with unedited computer-generated English Translation), 7 pages.

* cited by examiner

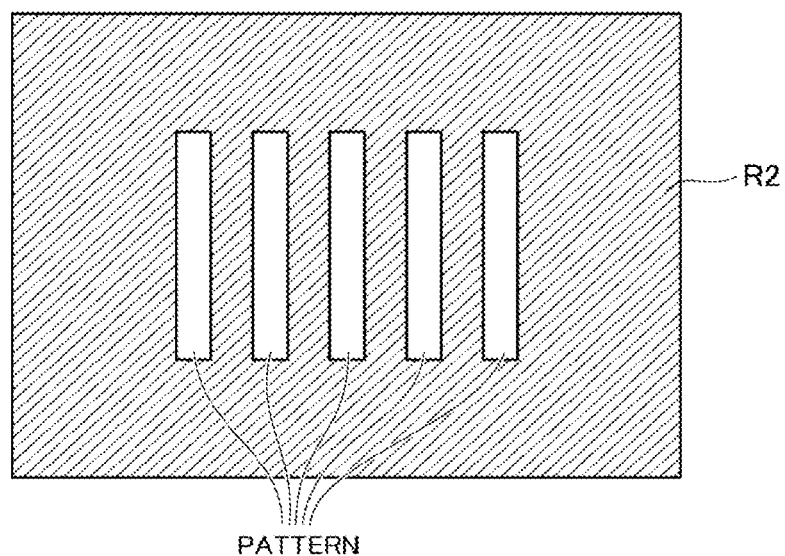

CHARGED PARTICLE BEAM WRITING METHOD, CHARGED PARTICLE BEAM WRITING APPARATUS, AND COMPUTER-READABLE RECORDING MEDIUM

CROSS REFERENCE TO RELATED APPLICATION

This application is based upon and claims benefit of priority from the Japanese Patent Application No. 2022-038282, filed on Mar. 11, 2022, the entire contents of which are incorporated herein by reference.

FIELD

The present invention relates to a charged particle beam writing method, a charged particle beam writing apparatus, and a computer-readable recording medium.

BACKGROUND

As LSI circuits are increasing in density, the line width of circuits of semiconductor devices is becoming finer. To form a desired circuit pattern onto a semiconductor device, a method of reducing and transferring, by using a reduction-projection exposure apparatus, onto a wafer a highly precise original image pattern (mask, or reticle, in particular, when used in a stepper or a scanner) formed on a quartz is employed. The highly precise original image pattern is written by using an electron beam writing apparatus, in which a technology commonly known as electron beam lithography is used.

In a case where a substrate such as a mask is irradiated with an electron beam, an irradiation position and a region around the irradiation position are charged by electron beam irradiation performed in the past, and the irradiation position is shifted. Hitherto, as a method for eliminating this beam irradiation position shift, a method is known in which an antistatic film (a charge dissipation layer (CDL)) is formed on the substrate to prevent the surface of a substrate from being charged. However, this antistatic film basically has acid characteristics and thus is not suitable for, for example, a case where a chemically amplified resist is applied onto the substrate. Moreover, new facilities need to be provided to form an antistatic film, thereby further increasing the manufacturing cost.

Thus, a technology for performing charging effect correction (CEC) without using an antistatic film has been proposed. In existing charging effect correction, there is a problem in that a correction residual increases as a charge amount difference between regions increases so that variations in beam irradiation position increase.

BRIEF DESCRIPTION OF THE DRAWINGS

FIG. 11 is a diagram illustrating an example of a non-dissolution irradiation region.

DETAILED DESCRIPTION

In a charged particle beam writing method according to an embodiment, a charged particle beam is deflected by a deflector, and a pattern is written by irradiating, with the charged particle beam, a substrate having a resist film formed thereon. The method includes irradiating a pattern region, in which a pattern is to be formed, with a beam at a first dose, irradiating at least part of a non-pattern region, in which a pattern is not to be formed, with the charged particle beam at a second dose, at which the resist film is not dissolved away, and determining the second dose based on the first dose and a charge amount of the resist film corresponding to a pattern density of the pattern region, wherein a charge amount difference between the pattern region and a non-dissolution irradiation region, which is irradiated at the second dose, is smaller than that obtained when the second dose is zero.

Hereinafter, an embodiment of the present invention will be described based on the drawings. According to the present embodiment, a structure that uses an electron beam as an example of a charged particle beam will be described. The charged particle beam, however, is not limited to the electron beam but may be another charged particle beam such as an ion beam.

Figure 1:
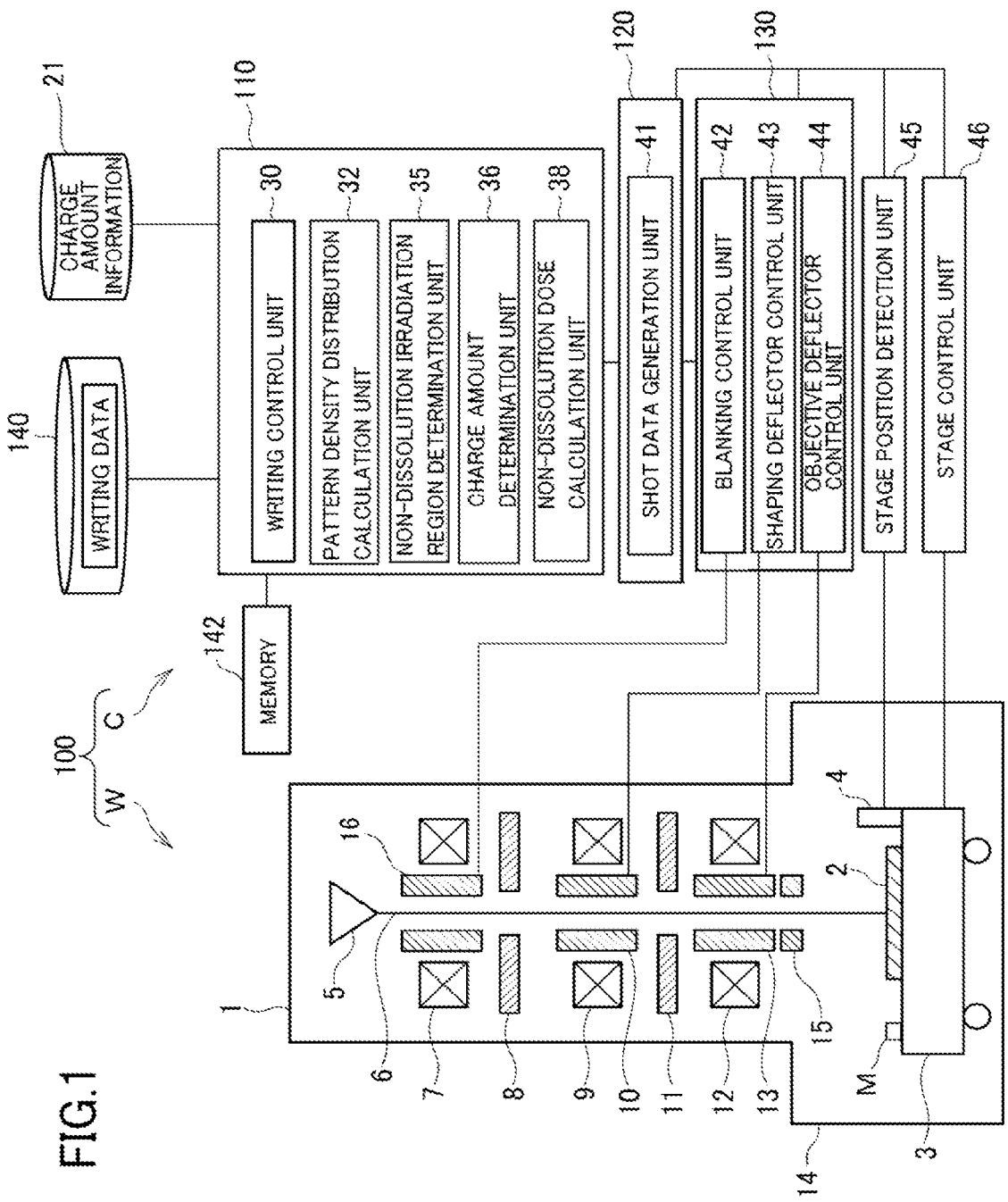
FIG. 1 is a schematic diagram of a writing apparatus according to an embodiment of the present invention.

FIG. 1 is a schematic configuration diagram of a writing apparatus according to an embodiment. A writing apparatus 100 illustrated in FIG. 1 includes a writing unit W and a control unit C. The writing apparatus 100 is an example of an electron beam writing apparatus. The writing unit W has an electric lens barrel 1 and a writing space 14. In the electronic lens barrel 1, an electron gun 5, an illumination lens 7, a first aperture plate 8, a projection lens 9, a shaping deflector 10, a second aperture plate 11, an objective lens 12, an objective deflector 13, an electrostatic lens 15, and a blanking deflector 16 are arranged.

In the writing space 14, an XY stage 3 is arranged. A substrate 2, which is a writing target, is arranged on the XY stage 3. The substrate 2 includes, for example, a photomask used for exposure in semiconductor manufacturing and a semiconductor wafer for forming a semiconductor device. A photomask to be subjected to writing includes a mask blank, on which nothing has been written yet. For example, the substrate 2 has quartz, a chromium film provided on the quartz, and a resist layer provided on the chromium film. On the XY stage 3, a mirror 4 for stage position measurement is arranged at a different position from the position where the substrate 2 is arranged.

On the XY stage 3, a mark M for calibration is provided at a different position from the position where the substrate 2 is arranged. For example, the mark M is made of metal and has a cross shape. Focus adjustment, position adjustment, deflection shape correction coefficient adjustment, and the like are performed by scanning the mark M using an electron beam and detecting reflected electrons from the mark M using a detector (not illustrated).

The control unit C has, for example, control calculators 110 and 120, a stage position detection unit 45, a stage control unit 46, a deflection control circuit 130, a memory 142, and storage devices 21 and 140 such as a magnetic disk device. The deflection control circuit 130 is connected to the blanking deflector 16, the shaping deflector 10, and the objective deflector 13.

The control calculator 110 has the functions of a writing control unit 30, a pattern density distribution calculation unit 32, a non-dissolution irradiation region determination unit 35, a charge amount determination unit 36, and a non-dissolution dose calculation unit 38. The writing control unit 30 controls the entirety of the apparatus. Each unit of the control calculator 110 may be configured using hardware including, for example, an electric circuit, a computer, a processor, a circuit board, a quantum circuit, or a semiconductor device or may be configured using software. Data input to and calculation results from each unit of the control calculator 110 are stored in the memory 142.

The control calculator 120 has the function of a shot data generation unit 41. The shot data generation unit 41 may be configured using software or hardware.

The deflection control circuit 130 has the functions of a blanking control unit 42, a shaping deflector control unit 43, and an objective deflector control unit 44. The blanking control unit 42, the shaping deflector control unit 43, and the objective deflector control unit 44 may be configured using software or hardware.

Writing data (layout data) in which a plurality of shape patterns to be written are defined is stored in the storage device 140.

An electron beam 6 emitted from the electron gun 5 (an emission unit) is caused to illuminate the entirety of the first aperture plate 8, which has a rectangular hole, by the illumination lens 7. In this case, first, the electron beam 6 is shaped so as to have a rectangular shape. The electron beam 6 of a first aperture image that has passed through the first aperture plate 8 is projected onto the second aperture plate 11 by the projection lens 9. The position of the first aperture image on the second aperture plate 11 is deflected by the shaping deflector 10 controlled by the shaping deflector control unit 43, so that the beam shape and size can be changed (variable shaping).

The electron beam 6 of a second aperture image that has passed through the second aperture plate 11 is focused by the objective lens 12, deflected by, for example, an electrostatic deflector (the objective deflector 13) controlled by the objective deflector control unit 44, and applied to a desired position on the substrate 2 on the XY stage 3, which is arranged so as to be movable. The XY stage 3 is driven and controlled by the stage control unit 46. The position of the XY stage 3 is detected by the stage position detection unit 45. The stage position detection unit 45 includes, for example, a laser length measurement device that irradiates the mirror 4 with laser to measure the position on the basis of the interference between incident light and reflected light. The electrostatic lens 15 dynamically corrects the focus position of the electron beam 6 in accordance with the roughness of the surface of the substrate 2 (dynamic focus).

Figure 2:
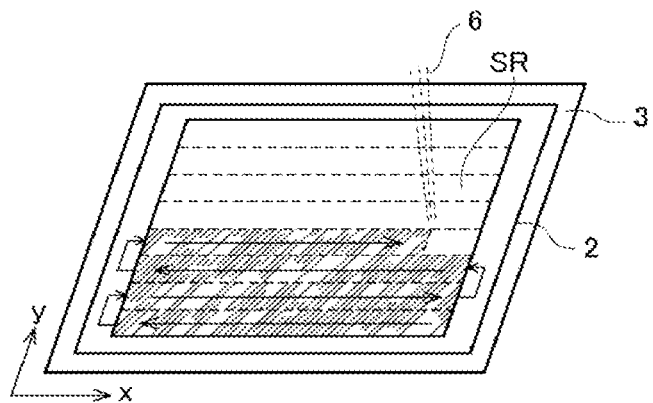
FIG. 2 is a diagram for describing the way in which a stage is moved.

FIG. 2 is a diagram for describing the way in which the stage is moved. In a case where writing is performed on the substrate 2, the XY stage 3 is continuously moved, for example, in the X direction. A writing region is virtually divided into a plurality of strip-shaped stripe regions (SR) having a width across which the electron beam 6 can be deflected. Writing processing is performed in units of a stripe region. The XY stage 3 is, for example, continuously moved in the X direction, and the shot position of the electron beam 6 is simultaneously caused to track the stage movement. By causing the XY stage 3 to move continuously, a writing time can be shortened.

After writing in one stripe region is finished, the XY stage 3 is step fed in the Y direction, and a writing operation is performed in the next stripe region in the X direction (the opposite direction). The travel time of the XY stage 3 can be shortened by performing the writing operation on the individual stripe regions in a meandering manner.

In the writing apparatus 100, in order to process layout data (writing data), the writing region is virtually divided into a plurality of strip-shaped frame regions, and data processing is performed on a frame region basis. In a case where multiple exposures are not performed, normally, the frame regions are the same as the stripe regions. In a case where multiple exposures are performed, the frame regions and the stripe regions become misaligned in accordance with the number of exposures. In this manner, the writing region of the substrate 2 is virtually divided into the plurality of frame regions (stripe regions), which are a plurality of writing unit regions, and the writing unit W performs writing on a frame region (stripe region) basis.

When the resist layer of the substrate 2 is irradiated with an electron beam, an irradiation position and a region around the irradiation position are charged. Due to a charge amount difference between a region where a pattern is formed (a beam irradiation region) and a region where a pattern is not formed (a region that is not irradiated with a beam), a beam irradiation position varies. The inventors found that variations in beam irradiation position can be suppressed by also irradiating, with a beam, a region where a pattern is not to be formed to the extent to which the resist of the region where a pattern is not to be formed is not dissolved away so that the charge amount of the surface of the resist becomes close to uniform across the entirety of the substrate.

In the present embodiment, in order to calculate a beam dose (a non-dissolution dose) at which the region where a pattern is not to be formed is irradiated to the extent to which the resist is not dissolved away, relationships $C(p, D_{exp})$ between a beam dose $D_{exp}$ and a pattern density p and a charge amount C of a pattern region regarding the substrate 2 are obtained in advance and are registered in advance as charge amount information in the storage device 21.

Figure 3A:
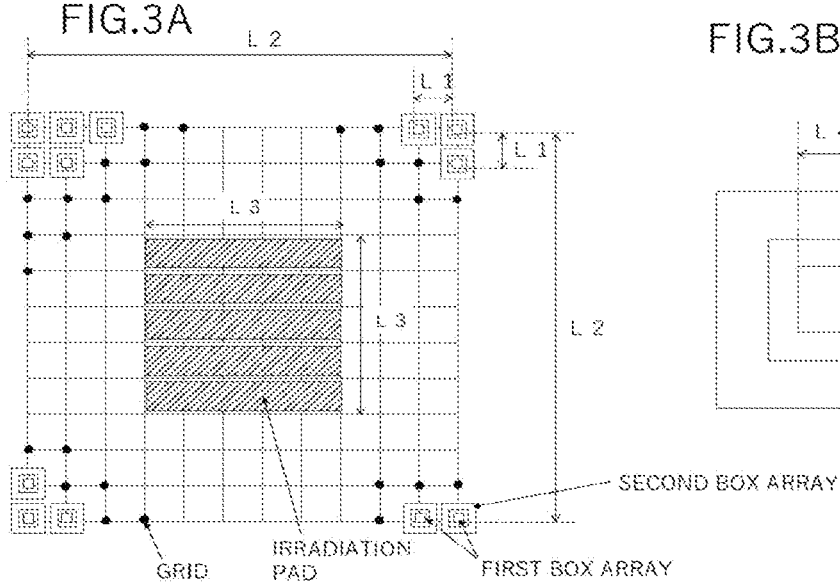
FIG. 3A is a diagram illustrating a test layout used to measure resist charging effect.

The charge amount information $C(p, D_{exp})$ can be experimentally obtained from, for example, writing results of a test layout disclosed in Japanese Patent No. 5480496. FIG. 3A is a diagram illustrating a test layout used to measure resist charging effect. Note that FIG. 3A is illustrated at different scales in order to clearly illustrate the details of the individual units.

Regarding a test layout illustrated in FIG. 3A, a first box array is written on a grid (an 81×81 grid) whose pitch L1 is 1 mm and that has sides whose lengths L2 are 80 mm. Thereafter, an irradiation pad having sides whose lengths L3 are 40 mm and having the pattern density p is written at the beam dose $D_{exp}$ in the center of the layout. After the irradiation pad is written, a second box array is written on the same grid for the first box array. As a result, the test layout can be obtained.

Figure 3B:
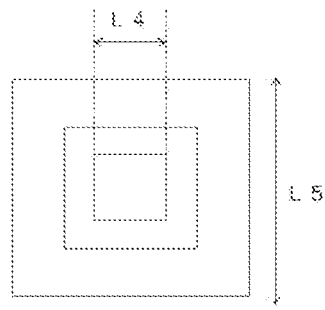
FIG. 3B is a schematic diagram regarding box arrays.

The first box array has, for example, a pattern formed by squares each having sides whose lengths L4 are 4 μm as illustrated in FIG. 3B in an enlarged manner. The second box array has, for example, a pattern formed by frame-like shapes each having sides whose lengths L5 are 14 µm. Each frame-like shape has a hollow in the center, and the hollows are larger than the squares of the first box array.

The pattern density of the irradiation pad and the dose for the irradiation pad are varied. For each pattern density and each dose, the test layout described above is formed.

Position shifts of the irradiation pad due to charging effect can be measured by measuring, using a resist image measurement method, the positions of the written first and second box arrays and subtracting the position of the first box array from the position of the second box array. As a result, a distribution $P_1$ of position shifts of the irradiation pad from design positions due to the charging effect is obtained.

Using a response function r(x, y) assumed to calculate position shifts from a charge amount distribution, charge amounts can be obtained from the distribution of position shifts as in the following. First, a distribution $P_0$ of position shifts is for a case where it is assumed that the irradiation pad is uniformly charged so as to have 1 $nC/cm^2$, and the distribution $P_0$ of position shifts is obtained by convolving a function $C_0(x, y)$, which gives 1 $nC/cm^2$ for the region on the irradiation pad and 0 for the region outside the irradiation pad, and the response function r(x, y) with each other as in the following Eq. (1).

$$P_0(x, y) = \int_{-\infty}^{\infty} dx' \int_{-\infty}^{\infty} dy' C_0(x', y') * r(x - x', x - y') = \int\int_{\substack{IRRADIATION \\ PAD \\ REGION}} 1 \cdot r(x - x', y - y') dx' dy' \quad (1)$$

The amount of charge of the irradiation pad can be calculated from a gradient obtained by correlating $P_0$ and the measurement result $P_1$. For each of the test layouts obtained by varying the pattern density and the dose, a charge amount is obtained.

Figure 4A:
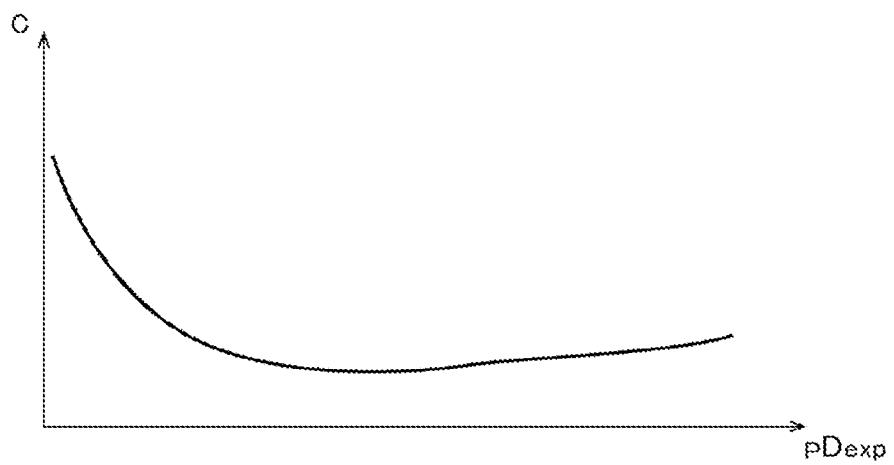
FIG. 4A and FIG. 4B are graphs representing charge amount information.

The charge amount information $C(p, D_{exp})$ is obtained as in FIG. 4A, in which $pD_{exp}$ serving as an indicator of the number of electrons with which irradiation is performed per unit volume is a variable.

Figure 4B:
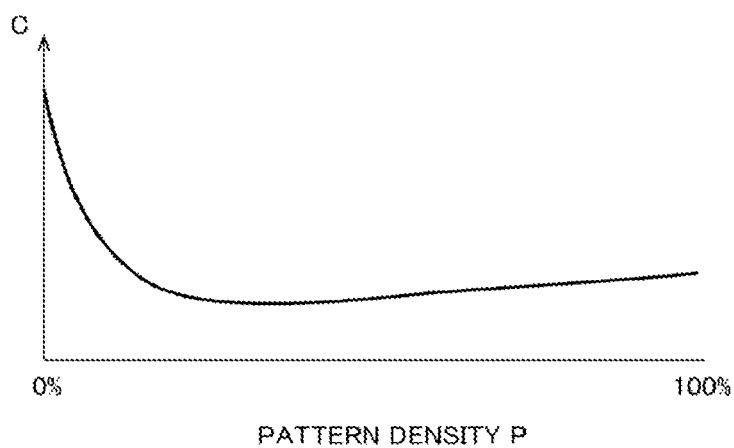

The beam dose $D_{exp}$ has a relationship expressed by the following Eq. (2), which is obtained from a proximity effect correction formula using a dissolution dose $D_{th}$ for the resist and a back-scattering coefficient η. Thus, the charge amount information $C(p, D_{exp})$ can also be expressed as in FIG. 4B, in which the pattern density p is a variable.

$$D_{exp} = \frac{D_{th}}{\frac{1}{2} + p\eta} \quad (2)$$

Figure 5:
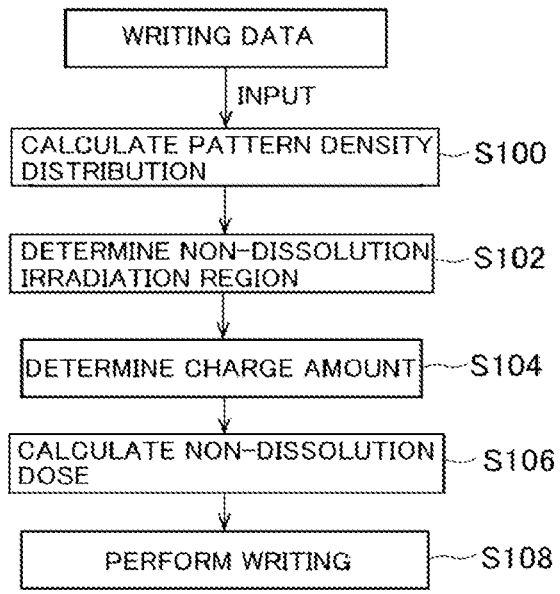
FIG. 5 is a flow chart for describing a writing method according to the present embodiment.

A writing method using a writing apparatus in which the charge amount information $C(p, D_{exp})$ obtained in this manner is registered in the storage device 21 will be described using a flow chart illustrated in FIG. 5. This writing method has a pattern density distribution calculation step (step S100), a non-dissolution irradiation region determination step (step S102), a charge amount determination step (step S104), a non-dissolution dose calculation step (step S106), and a writing step (step S108).

In the pattern density distribution calculation step (step S100), the pattern density distribution calculation unit 32 reads out writing data from the storage device 140, virtually divides the writing region (or the frame regions) in a mesh-like manner so as to have predetermined dimensions (grid dimensions), and calculates, for each mesh region, a pattern density representing the arrangement ratio of a shape pattern defined in the writing data. A pattern density distribution on a mesh region basis is then generated.

Figure 6:
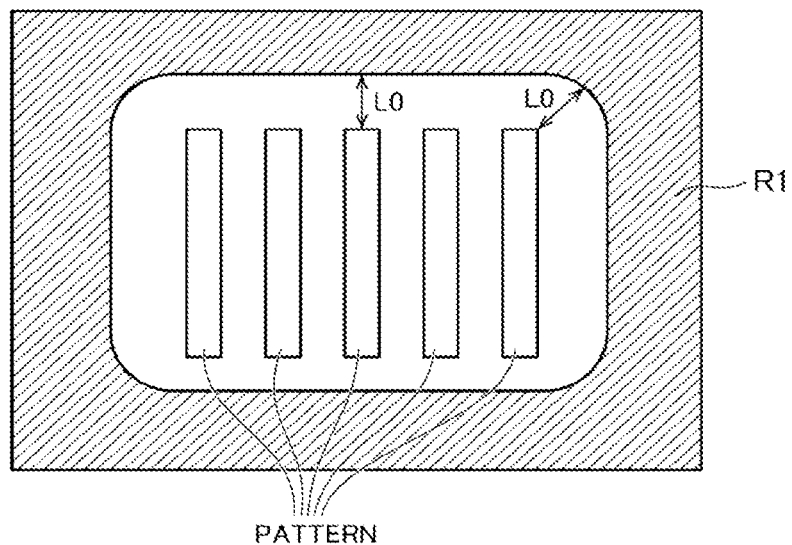
FIG. 6 is a diagram illustrating an example of a non-dissolution irradiation region.

In the non-dissolution irradiation region determination step (step S102), the non-dissolution irradiation region determination unit 35 determines a non-dissolution irradiation region that is to be irradiated with a beam at a non-dissolution dose. For example, as illustrated in FIG. 6, out of a non-pattern region where a pattern is not to be formed, a region that is spaced apart from the edges of pattern regions by a distance L0 beyond which the region is not affected by a backscattered electron caused by pattern irradiation (the region is not affected by a proximity effect) will be treated as a non-dissolution irradiation region R1. The distance L0 is, for example, on the order of 30 µm.

In the charge amount determination step (step S104), the charge amount determination unit 36 determines a charge amount Ct, which will be a target in the non-dissolution irradiation region. For example, a charge amount Ct corresponding to the most frequent pattern density (dose) in a writing layout is determined.

Figure 7:
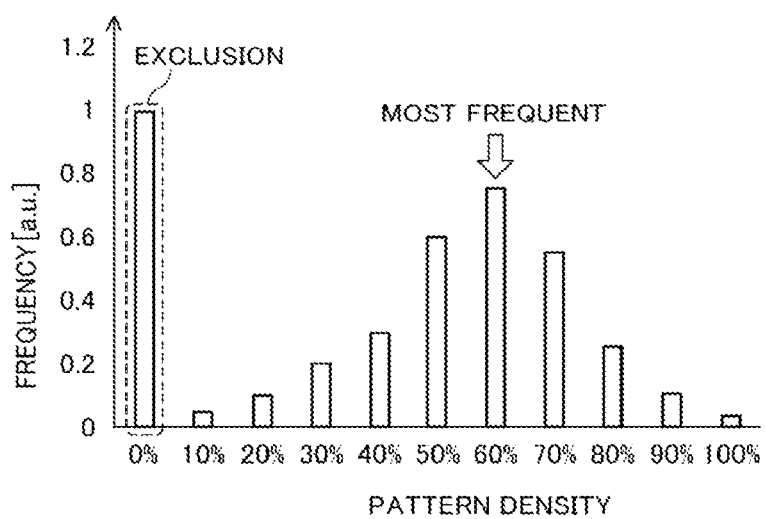
FIG. 7 is a histogram of pattern densities.

For example, a histogram of the pattern densities as illustrated in FIG. 7 is obtained on the basis of the pattern densities calculated by the pattern density distribution calculation unit 32 on a mesh region basis. The most frequent pattern density is extracted from this histogram. The average or a median value of the pattern densities may be used. In this case, a pattern density of 0% is excluded in advance.

Figure 8:
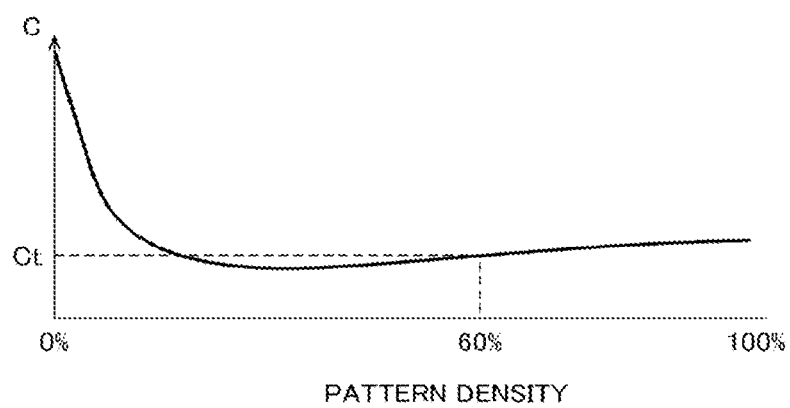
FIG. 8 is a diagram illustrating an example of a calculated target charge amount.

By referring to the charge amount information $C(p, D_{exp})$, the charge amount determination unit 36 determines a charge amount Ct, which will be a target, from the charge amount corresponding to the extracted pattern density. FIG. 8 illustrates an example of the charge amount Ct in a case where the extracted pattern density is 60%. Note that the charge amount Ct needs to be sufficiently lower than the dissolution dose $D_{th}$ for the resist; however, the charge amount Ct does not necessarily strictly match the charge amount corresponding to the pattern density, and it is sufficient that variations in charge amount be suppressed to some extent. That is, it is sufficient that a charge amount difference between a pattern region among the pattern regions and the non-dissolution irradiation region be smaller than that obtained in a case where the non-dissolution irradiation region is not irradiated with a beam.

Figure 9:
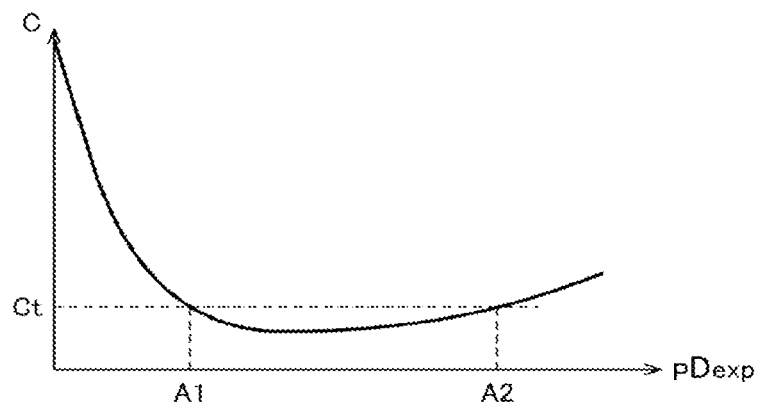
FIG. 9 is a diagram illustrating an example of a calculated non-dissolution dose.

In the non-dissolution dose calculation step (step S106), the non-dissolution dose calculation unit 38 references the charge amount information $C(p, D_{exp})$ to calculate a non-dissolution dose, which will serve as the charge amount Ct. In this case, for example, $pD_{exp}$ corresponding to the charge amount Ct is obtained as illustrated in FIG. 9. In this case, two solutions (A1, A2) are obtained as $pD_{exp}$. In a case where, for example, 30% of the dissolution dose $D_{th}$ for the resist is set as a margin, A1 is selected, which has a larger margin with respect to the dissolution dose $D_{th}$. In order to irradiate the non-dissolution irradiation region at a predetermined irradiation density to form, for example, a filled-in pattern (p=100%), the non-dissolution dose is calculated from the selected $pD_{exp}$.

In the writing step (step S108), in the control calculator 120, the shot data generation unit 41 reads out the writing data from the storage device 140 and generates shot data in a format unique to the writing apparatus 100 by performing multistage data conversion processing. The size of a shape pattern defined in the writing data is normally larger than a shot size that can be formed in one shot by the writing apparatus 100. Thus, in the writing apparatus 100, each shape pattern is divided into a plurality of shot shapes so as to have a size that can be formed in one shot by the writing apparatus 100 (shot division). For each shot shape, data such as a shape code representing a shape type, coordinates, and a size are defined as shot data.

In this case, the shot data generation unit 41 generates shot data assuming that the filled-in pattern is in the non-dissolution irradiation region determined in step S102.

The shot data generation unit 41 performs, regarding the pattern region, a proximity effect correction operation, for example. The shot data generation unit 41 obtains, for each shot, a dose (an irradiation time) and defines the dose in the shot data. Moreover, the shot data generation unit 41 defines, regarding the non-dissolution irradiation region, the non-dissolution dose calculated in step S106 in the shot data.

In shot order, the shaping deflector control unit 43 in the deflection control circuit 130 calculates, for each shot shape and for the shaping deflector 10, the amount of deflection for changing the shape of the electron beam 6, the amount of deflection being calculated from the shape type and size defined in the shot data. Moreover, the objective deflector control unit 44 calculates, for the objective deflector 13, the amount of deflection for deflecting the electron beam 6 to an irradiation position of the shot shape on the substrate 2. The objective deflector 13 arranged in the electronic lens barrel 1 deflects the electron beam in accordance with the calculated amount of deflection, so that the pattern is written on the substrate 2.

The blanking control unit 42 controls the blanking deflector 16 on the basis of doses (irradiation times) defined in the shot data and controls a dose on a shot basis.

Figure 10A:
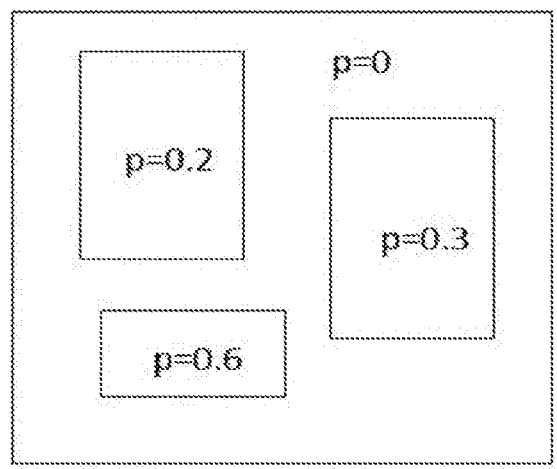
FIG. 10A is a diagram illustrating a writing layout.
Figure 10B:
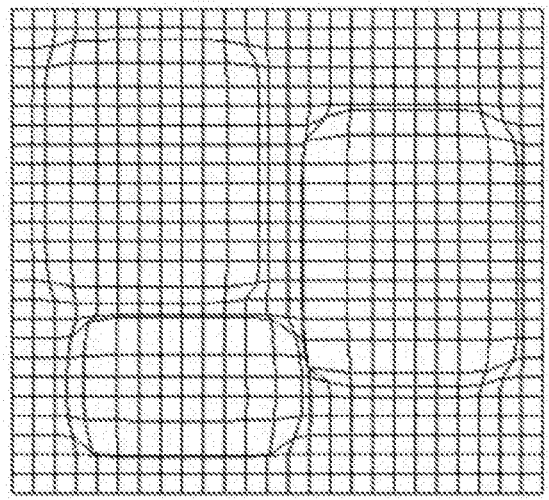
FIG. 10B is a diagram illustrating errors in beam irradiation position in a comparison example.
Figure 10C:
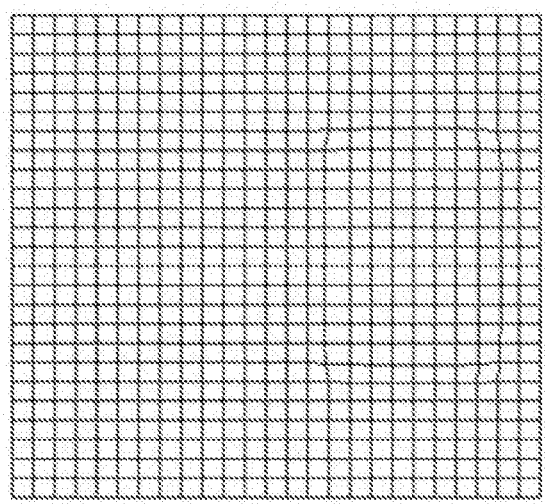
FIG. 10C is a diagram illustrating errors in beam irradiation position in the present embodiment.

In a case where techniques according to the present embodiment were not used for a writing layout illustrated in FIG. 10A, and existing charging effect correction was performed to write patterns, for each pattern region, correction residuals at a boundary portion between the pattern region and the non-pattern region increased as illustrated in FIG. 10B. In contrast, in a case where the techniques according to the present embodiment were used to write the patterns, it was confirmed that variations in beam irradiation position can be reduced as illustrated in FIG. 10C.

In this manner, according to the present embodiment, the non-pattern region is irradiated with a beam at the non-dissolution dose such that the charge amount of the surface of the resist becomes close to uniform across the entirety of the substrate. Thus, variations in beam irradiation position can be reduced.

In the above-described embodiment, the example has been described in which the region that is spaced apart from the edges of the pattern regions by the distance L0 is treated as the non-dissolution irradiation region R1; however, the entirety of the region other than the patterns (the entire non-pattern region) as illustrated in FIG. 11 may be treated as a non-dissolution irradiation region R2.

In this case, a dose $B_{exp}$ for the non-dissolution irradiation region R2 is determined from the distribution of the patterns so as to satisfy a proximity effect correction formula expressed by the following Eq. (3). In Eq. (3), g(x) is a function representing backscattering.

$$\frac{D_{exp}(x)}{2} + \eta \int_{\substack{PATTERN \\ REGION}} D_{exp}(x_1)g(x-x_1)dx_1 + \quad (3)$$

-continued
$$\eta \int_{\substack{NON- \\ PATTERN \\ REGION}} B_{exp}(x_2)g(x-x_2)dx_2 = D_{th}$$

When the pattern density p is defined, an equation as in the following Eq. (4) can be expressed.

$$D_{exp}(p, B_{exp}) = D_{base}\frac{\frac{1}{2}+\eta}{\frac{1}{2}+p\eta} - B_{exp}\frac{1-p}{\frac{1}{2}+p\eta}\eta \quad (4)$$

A charge amount Q is determined by the pattern density p, a dose $D_{exp}$ for a pattern region among the pattern regions, and the beam dose $B_{exp}$ for the non-dissolution irradiation region R2. Test layouts as illustrated in FIG. 3A are written by varying, for example, p, $D_{exp}$, and $B_{exp}$, and a charge amount Q(p, $D_{exp}$, $B_{exp}$) is obtained from the writing results. The charge amount Q(p, $D_{exp}$, $B_{exp}$) can be expressed by a polynomial as in Eq. (5).

$$Q = a^*D_{exp} + b^*B_{exp} + c^*pD_{exp} + d^*pB_{exp} \quad (5)$$

For a freely determined pattern density p, $B_{exp}$ is determined such that the charge amount Q(p, $D_{exp}$, $B_{exp}$) becomes constant. The non-dissolution dose $B_{exp}$ with respect to a mask region having the pattern density p is obtained by solving a function Q(p, $D_{exp}(B_{exp})$, $B_{exp}$)=a constant, the function Q being a function of charge amount and dose. In this case, $D_{exp}(B_{exp})$ is a function that satisfies a proximity effect correction formula. $B_{exp}$ is obtained by solving the following Eq. (6). In a case where there is not a solution, $B_{exp}$ is set to a predetermined constant dose.

$$\frac{D_{exp}(x)}{2} + \eta \int_{\substack{PATTERN \\ REGION}} D_{exp}(x_1)g(x-x_1)dx_1 + \quad (6)$$

$$\eta \int_{\substack{NON- \\ PATTERN \\ REGION}} B_{exp}(x_2)g(x-x_2)dx_2 = D_{th}$$

$$Q = a*D_{exp} + b*B_{exp} + c*pD_{exp} + d*pB_{exp} = const.$$

In a case where $B_{exp}$ is obtained for the entire surface of the substrate, the distribution of charge becomes uniform, so that variations in beam irradiation position can be suppressed.

Even in a case where $B_{exp}$ is not obtained for the entire surface of the substrate, the effect can be provided when a charge amount difference between the pattern region and the non-pattern region becomes smaller than that obtained in a case where the non-pattern region is not irradiated. However, nonuniformity in charge amount remains, so that the effect is realized to a limited degree. In that case, charging effect correction (CEC) using charge amount estimation may also be used in combination.

In the present embodiment described above, a single beam writing apparatus has been described; however, the techniques may also be used for a multi-beam writing apparatus.

Irradiation position shifts due to charging phenomena do not happen only to electron beam writing apparatuses. The present invention can be used for a charged particle beam apparatus that uses a result obtained by irradiating a target position with a charged particle beam, the charged particle beam apparatus being, for example, an inspection apparatus that inspects a pattern using a charged particle beam such as an electron beam.

In the above-described embodiment, in order to reduce the effect of fogging charging in which electrons scattered in the writing space fall down onto the substrate and to make direct charging by an electron beam with which irradiation is performed predominant, secondary electrons may be prevented from returning to the surface of the substrate by applying a positive potential to the bottom surface of the objective lens 12 (an objective optical system).

While certain embodiments have been described, these embodiments have been presented by way of example only, and are not intended to limit the scope of the inventions. For example, although the above embodiments employ the variable formation beam that is shaped at each shot and is irradiated, a beam having a definite shape may be irradiated. A plurality of beams can be irradiated simultaneously. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A charged particle beam writing method in which a charged particle beam is deflected by a deflector, and a pattern is written by irradiating, with the charged particle beam, a substrate having a resist film formed thereon, the charged particle beam writing method comprising:
    irradiating a pattern region, in which a pattern is to be formed, with a beam at a first dose;
    irradiating at least part of a non-pattern region, in which a pattern is not to be formed, with the charged particle beam at a second dose, at which the resist film is not dissolved away; and
    determining the second dose based on the first dose and a charge amount of the resist film corresponding to a pattern density of the pattern region, wherein a charge amount difference between the pattern region and a non-dissolution irradiation region, which is irradiated at the second dose, is smaller than that obtained when the second dose is zero.

2. The method according to claim 1, wherein, out of the non-pattern region, a region spaced apart from the pattern region by a predetermined distance is irradiated with the charged particle beam at the second dose.

3. The method according to claim 2, wherein the region spaced apart from the pattern region by the predetermined distance is irradiated with the charged particle beam at the second dose to form a filled-in pattern.

4. The method according to claim 1, wherein the non-pattern region is entirely irradiated with the charged particle beam at the second dose.

5. The method according to claim 1, wherein the second dose is determined based on the first dose and a charge amount of the resist film corresponding to a most frequent pattern density in a writing layout.

6. The method according to claim 1, wherein a positive potential is applied to a bottom surface of an objective lens that adjusts focus of the charged particle beam, with which the substrate is irradiated.

7. A charged particle beam writing apparatus in which a charged particle beam is deflected by a deflector, and a pattern is written by irradiating, with the charged particle beam, a substrate having a resist film formed thereon, the charged particle beam writing apparatus comprising:
    an emission unit emitting the charged particle beam;
    a storage storing charge amount information representing a relationship between a first dose for the charged particle beam for a pattern region, which is a region where a pattern based on writing data is to be formed, and a pattern density of the pattern region, and a charge amount of the resist film;
    a non-dissolution dose calculator referencing the charge amount information and calculating a second dose for a case where a non-pattern region is irradiated with the charged particle beam based on the first dose and the charge amount of the resist film obtained from the pattern density of the pattern region, the non-pattern region being a region where a pattern is not to be formed, such that the resist film is not dissolved away, and a charge amount difference between the pattern region and a non-dissolution irradiation region, which is irradiated at the second dose, is smaller than that obtained when the second dose is zero; and
    a writer irradiating the pattern region with the charged particle beam at the first dose and irradiating the non-pattern region with the charged particle beam at the second dose.

8. The apparatus according to claim 7, wherein the writer irradiates the charged particle beam at the second dose to, out of the non-pattern region, a region spaced apart from the pattern region by a predetermined distance.

9. The apparatus according to claim 8, wherein the writer irradiates the charged particle beam at the second dose to form a filled-in pattern to the region spaced apart from the pattern region by the predetermined distance.

10. The apparatus according to claim 7, wherein the writer irradiates the entire non-pattern region with the charged particle beam at the second dose.

11. The apparatus according to claim 7, wherein the non-dissolution dose calculator calculates the second dose based on the first dose and a charge amount of the resist film corresponding to a most frequent pattern density in a writing layout.

12. The apparatus according to claim 7, wherein the writer includes an objective lens adjusting focus of the charged particle beam irradiated to the substrate and applies a positive potential to a bottom surface of the objective lens.

13. A non-transitory computer-readable recording medium storing a program causing a computer to execute: irradiating a substrate having a resist film formed thereon with a charged particle beam and calculating, for the charged particle beam, a first dose at which the resist film is dissolved away to form a pattern; and calculating a second dose for a case where a non-pattern region of the substrate is irradiated with the charged particle beam based on the first dose and a charge amount of the resist film corresponding to a pattern density of a pattern region in which the pattern is to be formed, the non-pattern region being a region where a pattern is not to be formed, such that the resist film is not dissolved away, and a charge amount difference between the pattern region and a non-dissolution irradiation region, which is irradiated at the second dose, is smaller than that obtained when the second dose is zero.

14. The transitory computer-readable recording medium according to claim 13, wherein the second dose is calculated based on the first dose and a charge amount of the resist film corresponding to a most frequent pattern density in a writing layout.

* * * * *